US009009524B2

(12) United States Patent
Tucek et al.

(10) Patent No.: US 9,009,524 B2
(45) Date of Patent: Apr. 14, 2015

(54) PRIORITIZING RECOVERY IN A STORAGE SYSTEM IMPLEMENTING RAID

(75) Inventors: Joseph A Tucek, Palo Alto, CA (US); Eric A Anderson, Mountain View, CA (US); John Johnson Wylie, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 288 days.

(21) Appl. No.: 13/460,807

(22) Filed: Apr. 30, 2012

(65) Prior Publication Data

US 2013/0290775 A1 Oct. 31, 2013

(51) Int. Cl.
*G06F 11/00* (2006.01)
*G06F 11/07* (2006.01)
*G06F 11/10* (2006.01)

(52) U.S. Cl.
CPC ........ *G06F 11/1076* (2013.01); *G06F 11/0727* (2013.01); *G06F 11/0757* (2013.01)

(58) Field of Classification Search
CPC . G06F 11/2094; G06F 11/0684; G06F 11/08; G06F 11/0793; G06F 2211/1028
See application file for complete search history.

(56) References Cited

U.S. PATENT DOCUMENTS

| 7,487,385 | B2 | 2/2009 | Rodrigues et al. | |
|---|---|---|---|---|
| 7,555,701 | B2 | 6/2009 | Subbarao | |
| 7,577,866 | B1 | 8/2009 | Fan et al. | |
| 7,624,305 | B2 * | 11/2009 | De Araujo et al. | 714/25 |
| 7,725,768 | B1 * | 5/2010 | Bezbaruah et al. | 714/15 |
| 8,819,516 | B2 * | 8/2014 | Dhuse et al. | 714/752 |
| 2007/0234115 | A1 * | 10/2007 | Saika | 714/13 |
| 2008/0126847 | A1 * | 5/2008 | Koarashi | 714/6 |
| 2011/0066803 | A1 * | 3/2011 | Arakawa et al. | 711/114 |
| 2011/0252201 | A1 | 10/2011 | Koren et al. | |
| 2011/0264949 | A1 | 10/2011 | Ikeuchi et al. | |
| 2012/0311381 | A1 * | 12/2012 | Porterfield | 714/6.22 |

OTHER PUBLICATIONS

Holland, M. and Gibson, G. A., "Parity Declustering for Continuous Operation in Redundant Disk Arrays," Proceedings of the $5^{th}$ Conference on Architectural Support for Progamming Languages and Operating Systems, 1992, pp. 1-13.
Holland, M. et al. "Fast, On-line Failure Recovery in Redundant Disk Arrays," 1993, pp. 422-431 (IEEE).

* cited by examiner

*Primary Examiner* — Christopher McCarthy
(74) *Attorney, Agent, or Firm* — Dickinson Wright

(57) ABSTRACT

A method for determining priority of recovery for a RAID implementation includes detecting a first failure of the RAID implementation; detecting a second failure of the RAID implementation; assigning a first priority to the first failure and a second priority to the second failure; and setting the priority of the recovery based on the first priority and the second priority.

10 Claims, 6 Drawing Sheets

PRIORITIZING RECOVERY IN A STORAGE SYSTEM IMPLEMENTING RAID

BACKGROUND

Large data centers employ redundant array of independent disks (RAID) technology to provide data protection. This RAID technology may distribute data over several disks. A RAID implemented data system may provide various levels of redundancy and performance based on preferences established by a user or system administrator. In a RAID implemented data system, if a single disk fails, through data recovery and usage of redundancy, an end user may, not even be aware of the failure.

However, in a standard RAID implementation, if a single disk fails, performance may be degraded while the associated data with the failed disk is rebuilt on another disk (such as a redundant disk). Thus, various implementations have been developed to improve recovery times.

One such implementation is a declustered RAID system. In a declustered RAID system, parity groups (or stripes) of data are randomly distributed over all available disks. Further, redundancy stripes also may be distributed over several available disks. Thus, if a single disk fails, the recovery process uses the bandwidth of all available disks, which leads to faster recovery times. However, a bottleneck still may occur due to a delay in detecting an error on the disk.

DESCRIPTION OF THE DRAWINGS

The detailed description will refer to the following drawings in which like numerals refer to like items, and in which:

FIG. 2(*b*) illustrates the declustered RAID system according to the RAID system shown in FIG. 1, responding to a failure;

FIG. 2(*c*) illustrates a clustered RAID;

DETAILED DESCRIPTION

Figure 1:
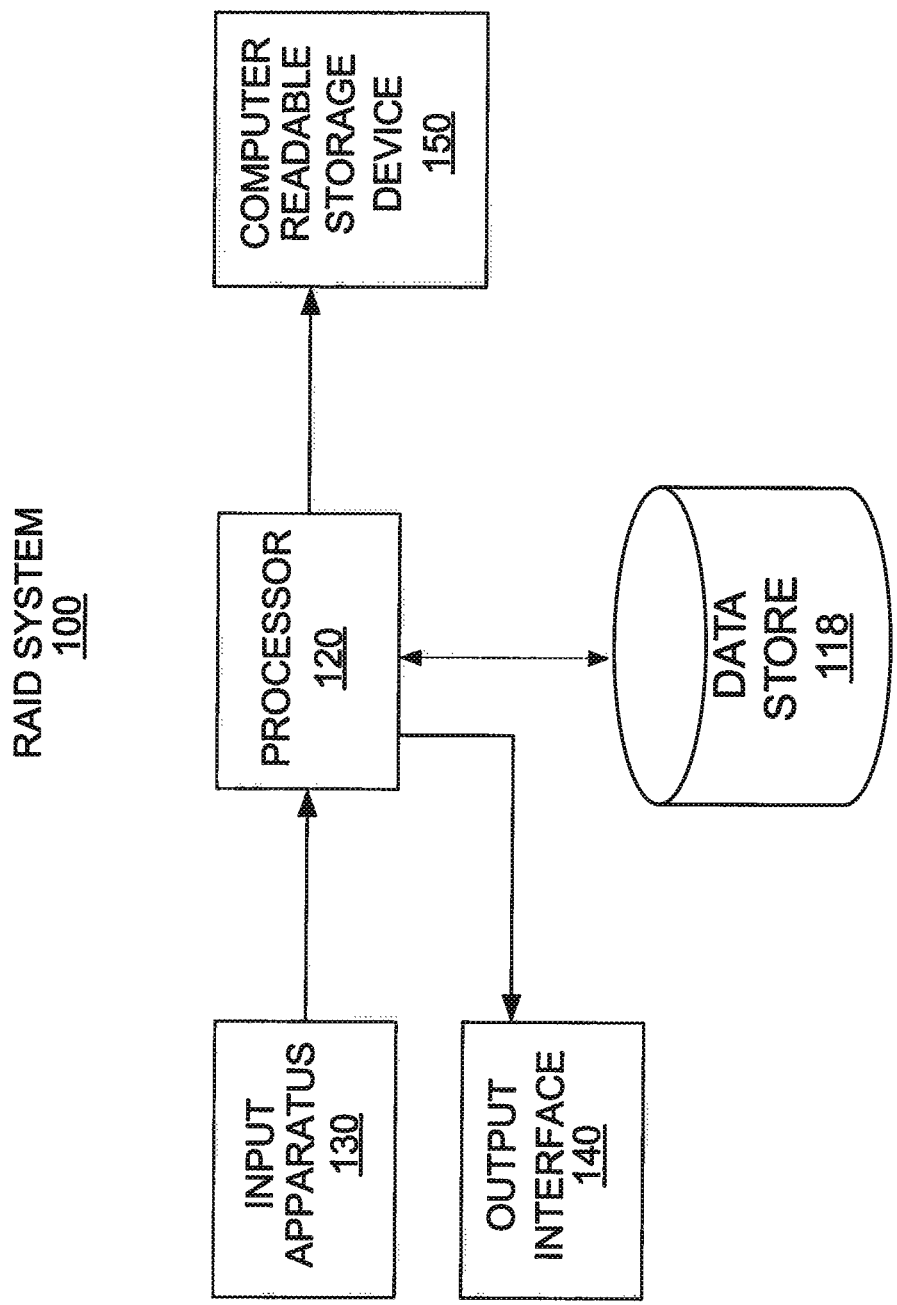
FIG. 1 is a block diagram of an embodiment of a RAID system.

Data storage is provided for systems and users along with RAID implementations to prevent failures, thereby causing a loss of data. RAID technology uses redundancy in order to provide backup on a parallel space if a failure occurs. However, in RAID systems, slow recovery leaves data vulnerable to additional failures.

In a common, clustered RAID implementation, data storage systems may be configured to be two-disk fault tolerant. Thus, data may not be lost if there are only two simultaneous failures. If the data storage system has a small number of disks, the likelihood of more than two simultaneous failures occurring is relatively small. However, if the data storage system increases the number of disks, the likelihood of more than two simultaneous failures may drastically increase. When more disks are used, there is a higher likelihood of more than two simultaneous failures.

Declustered RAID disks are not immune to the issue of experiencing a higher probability of failure as the number of disks used increases. If a storage system using a declustered RAID group experiences three simultaneous failures there is a likelihood that a parity group or stripe spanning those three drives will be affected by, one of those failures, thereby causing data loss. However, because declustered RAID disks are quicker than a clustered RAID implementation to recover, the use of the declustered RAID systems may be preferred.

Disclosed herein are RAID systems and corresponding methods that allow for the quick recovery of data, while judiciously determining a fault detection based on priority information associated with each failure. In both clustered and declustered RAID systems, as the number of disks increase, the susceptibility to a three disk simultaneous error increases. The herein disclosed examples and methods reduce the susceptibility to these errors.

With a declustered RAID group, various parity groups or stripes and spare space are distributed over the various available disks independently of how the other stripes are distributed. E.g. the distribution of a stripe may be random, subject to available space and not distributing multiple portions of one stripe on the same disk. If a disk experiences a failure, the recovery process uses the bandwidth available through all or multiple disks. In contrast to a clustered RAID approach, if a disk experiences a failure, the system recovery time is based on the amount of time required to duplicate the contents of the failed disk to a single spare or redundant disk.

However, a bottleneck still occurs due to the amount of time the detection of a failure entails. Also, as explained in further detail below certain errors and failures may not justify a recovery.

In one example, failures may be classified in two sub-categories, such as "sure" failures and "unsure" failures. A "sure" failure may include failures that have a low false positive. In the case of a "sure" failure, there is a high probability that data will be lost. A "sure" failure may indicate a hard disk failing or not being responsive.

An "unsure" failure, on the contrary, may be quickly detected (or more quickly detected than a "sure" failure), but may have a high false positive rate (i.e. wrongly detecting an failure). Thus, an "unsure" failure may falsely be a failure at a higher probability than an "unsure" failure. An "unsure" failure may be caused by a vibration causing a drive to mis-seek, or a drive being temporarily dropped from the bus. "Unsure" failures may also relate to failures that can be characterized as symptomatic of availability issues. However, not all unsure failures are due to availability issues. Certain cases of unsure may be indicative of a deeper and more deleterious problem.

The herein disclosed methods and systems for optimizing detection of failures for a declustered RAID system, prioritize failures, to ensure that the failures that may be more harmful are addressed at an earlier stage, than a failure that may be less harmful or not even a failure at all (i.e. based on a false detection).

FIG. 1 illustrates a simplified block diagram of an embodiment of a RAID system. In FIG. 1, RAID system 100 includes a processor 120, an input apparatus 130, an output interface 140, and a data store 118. The data store 118 may, include several drives, implemented on multiple instances of a RAID system 100, which coordinates the drives over a network according to the aspects disclosed herein. The processor 120 implements and/or executes the RAID system 100. The RAID system 100 may include a computing device, and may include an integrated and/or add-on hardware component of the computing device. Further, a computer readable storage device 150 which stores instructions and functions for the processor 120 to execute may also be provided.

The processor 120 receives an input from an input apparatus 130. The input apparatus 130 may include, for instance, a user interface through which a user may access data, such as, objects, software, and applications that are stored in the data store 118. In addition, or alternatively, a user may interface with the input apparatus 130 to supply data into and/or update, previously stored data in the data store 118. The input apparatus 130 may include a user interface through which a user may access versions of the data stored in the data store 118, as outputted through the output interface 140.

Figure 2A:
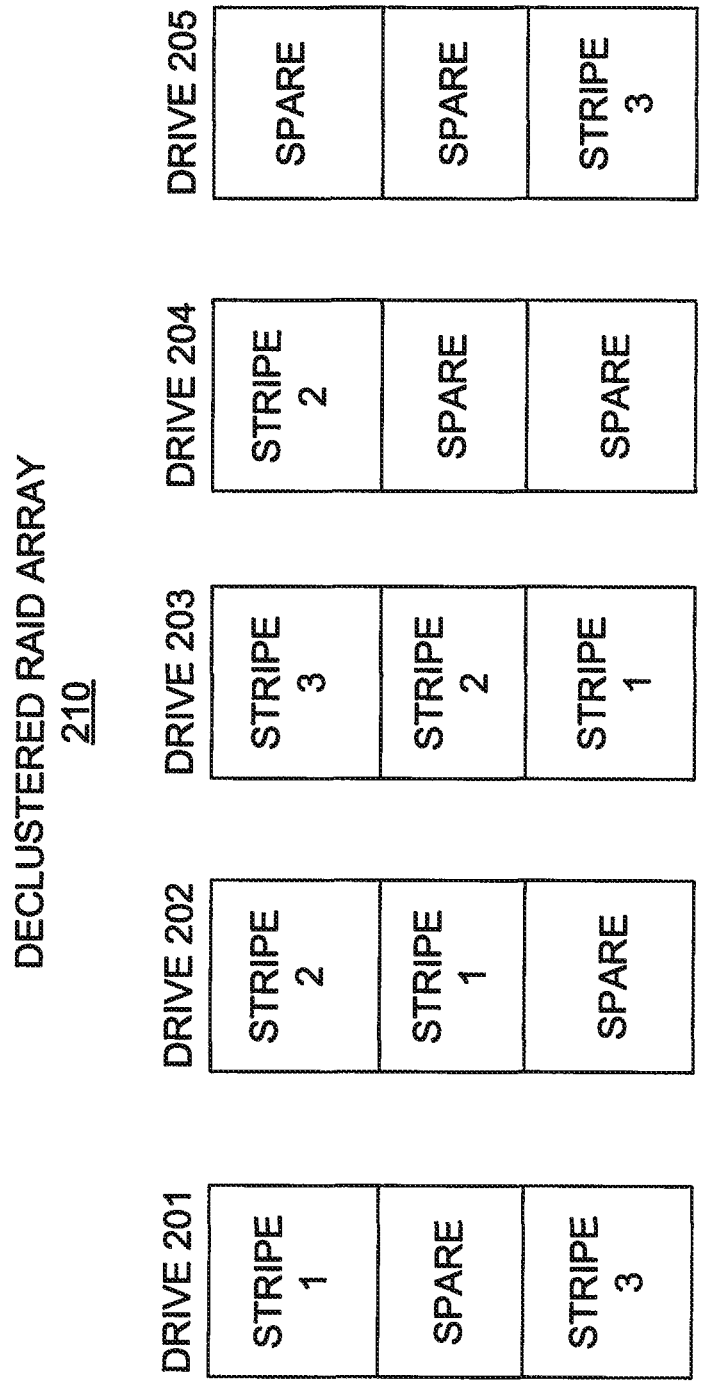
FIG. 2(*a*) illustrates a declustered RAID system according to the RAID system shown in FIG. 1.
Figure 2B:
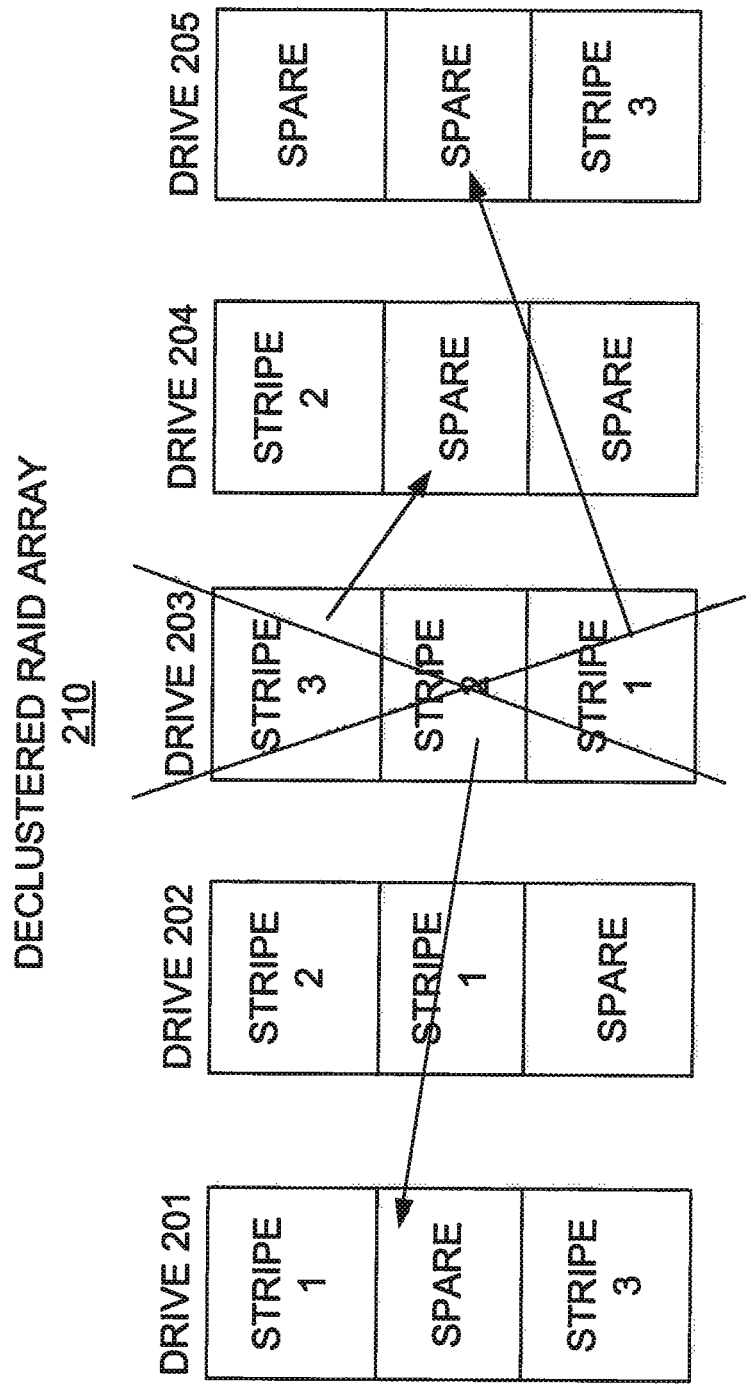

FIG. 2(a) illustrates a declustered RAID array 210 according to the RAID system shown in FIG. 1. FIG. 2(b) illustrates a declustered RAID system that responds to a failure.

Referring to FIG. 2(a), the RAID array, shows five drives: drive 201, drive 202, drive 203, drive 204, and drive 205. Each drive shown may refer to a hard disk or a common data storage device. Also shown are three stripe groups (or parity groups), 1 through 3; and some spare space. The number of drives and stripe groups shown in FIG. 2(a) and described in this example are merely chosen for the purposes of example, and thus, according to aspects of the concepts disclosed herein, various other numbers of drives and cluster groups may be used based on the RAID system being implemented. For example, an n-array, of drives may be used, with n indicating the number of drives.

A stripe group of data, such as stripe group 1, 2, or 3, may be randomly distributed over drive 201, drive 202, drive 203, drive 204, and drive 205. By randomly distributing the data over several drives, if a single drive fails, the stripe group may be recovered by accessing all, or several of the available drives.

Referring to FIG. 2(b), drive 203 experiences a failure. In order to recover from the failure, i.e., repair the RAID system, the parity groups previously located in drive 203 are re-populated in available spare space, such as the spare space on drives 201, 204, and 205. Thus, with a declustered RAID array 210, parity may be rebuilt while utilizing most of the system's drives in parallel.

Figure 2C:
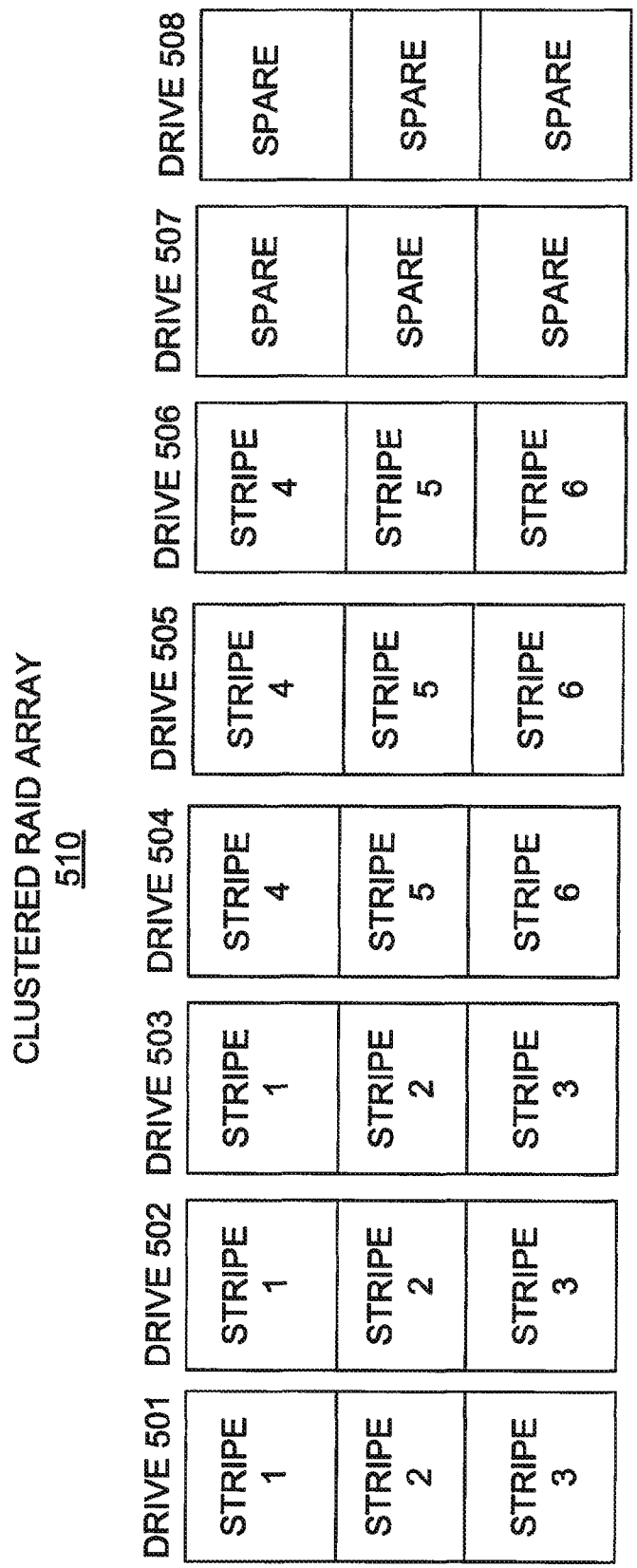

FIG. 2(c) illustrates a clustered raid array 510. Drives 501, 502, and 503 all have common stripe groups (or parity groups), while drives 504, 505, and 506 also have common stripe groups. Drives 507 and 508 are dedicated as spares.

Figure 3:
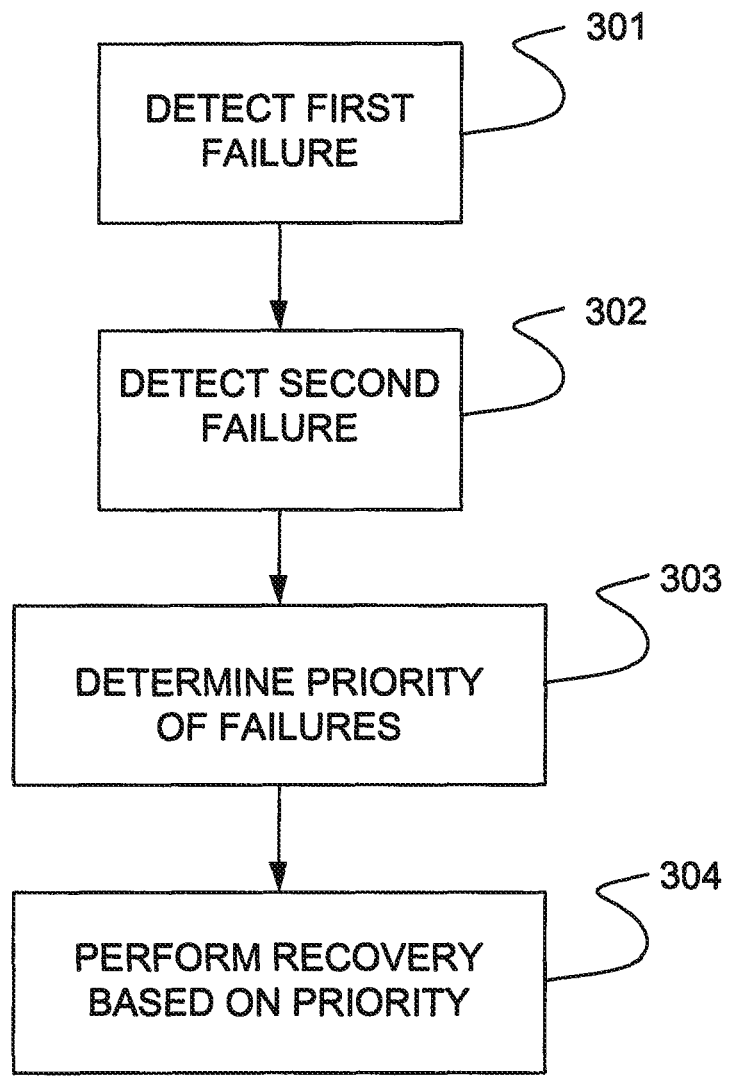
FIG. 3 is a flowchart illustrating a method for prioritizing the failures of a RAID system according to FIG. 1.

FIG. 3 is a flowchart illustrating a method for prioritizing the recovery from failure.

As stated above, while the declustered RAID array 210 offers faster recovery due to the use of parallel access, to various drives, a bottleneck may still occur due to the detection of a failure. Further, if simultaneous failures occur, the integrity of a RAID array 210 may be compromised. In order to prevent this bottleneck from slowing down recovery and simultaneous failures from occurring, a scheme for prioritizing failures is disclosed herein.

At block 301, a failure is detected. This failure may occur simultaneously, or at a similar time with another failure. Further, as explained above, the failure may be classified into a category, for example, a "sure" failure or an "unsure" failure. The "sure" failure may indicate a failure with a high probability of being an actual failure, and conversely, an "unsure" failure may indicate a failure with a low probability of being an actual failure. For example, a "sure" failure may refer to a drive failing as indicated by multiple failed access with multiple retries and long timeouts, while an "unsure" failure may be a temporal issue, that is not permanent (e.g. as indicated by a single failed access, or with few/no retries and a short timeout). Thus, if a failure is detected, a type of the failure may also be determined as well.

If the detected failure at block 301 occurs simultaneously with another failure, at block 302, the second failure is also detected. Thus, the second failure's type and category are determined similarly to the detection of the first failure.

At block 303, the RAID system 100 determines a priority of each detected failure. For example, the RAID system 100 may determine that a "sure" failure is given a higher priority than an "unsure" failure. Thus, if the two failures occur simultaneously (as detected at block 301 and block 302), and it is determined that the failure at, block 301 is classified as a "sure" failure, and the block at 302 is classified as an "unsure" failure—the RAID system 100 may perform a recovery based on the failure detected at block 301.

At block 304, the RAID system 100 performs a recovery based on the determined highest priority failure from block 303. Thus, in the example presented above, a recovery is performed on the failure detected at block 301 first.

In the example described according, to FIG. 3, one such weighting is presented, i.e. establishes that "sure" failures are at a higher priority versus "unsure" failures. However, several implementations of weighting failures may be used. Some examples of different weightings to determine priority of a failure recovery will now be described.

For example, the weighting may be influenced by a frequency of certain failures. For example, one "sure" failure may take priority over 9 failures, however, if 10 "unsure" failures are counted, the "unsure" failure is then given priority over a simultaneous "sure" failure. In this way, a higher frequency of "unsure" failures may indicate that the "unsure" failure corresponds to an actual failed drive versus a false positive detection. Similarly, while a stripe group which is involved in a single "unsure" failure may receive a recovery priority of "don't recover", if the same stripe group is involved in a further "unsure" failure it may be scheduled for recovery.

In another example, the system may determine a priority based on various other types of classifications. For example, failures may be classified as network failures, slow disk failures, and/or dead disk error failures. Each classification of failure may be associated with a priority. Thus, a RAID system 100 may prioritize a dead disk error as being the highest priority, and recover failures of these type first.

Thus, based on the aspects disclosed herein, a RAID system 100 may avoid potential delays by first addressing failures that are more likely to be a true failure. A RAID system 100 may not waste time or, space resources on a failure that may be a false positive or is not critical to address at a certain time.

Figure 4:
FIG. 4 illustrates a table for centralized management of prioritized recovery for a RAID system.

FIG. 4 illustrates a table for centralized management of prioritized recovery for a RAID system 100. The table of FIG. 4 may be stored on a memory, such as data store 118 (referring to FIG. 1).

Referring to FIG. 4, a graphical presentation of a priority table 400 is shown. The priority table 400 has several fields allowing for management of various priorities. The priority table 400 includes, a parity group 401, a hash-map of disks to the parity group pointer 402, a count of "sure" failures 403, and a count of "unsure" failures 404. The priority table 400 is not limited to these fields, and may be customized or updated based on a user preference.

Every time a failure occurs, the priority table 400 may be updated, and subsequently re-sorted. Thus, if a simultaneous error occurs, a RAID system 100 may determine which parity group is recovered first based on the priority table 400. As explained above, with reference to FIG. 3, a priority may be determined by any of the enumerated weighting schemes described herein, or other schemes appropriate for the RAID system 100 being implemented.

Alternatively, a priority table may be implemented in a de-centralized manner. For example, each parity group may have a block of data dedicated to information about a history of failures associated with the respective parity group. In order to conserve resources and space, the parity groups that experience a certain type of failure (such as "sure" failures) may have a dedicated block for priority information, while other parity groups may not include this information.

Additionally, or alternatively to, regardless of the type of error—during a recovery, instead of utilizing a redundancy block, the recovery may generate a new parity block. In this way, for example, if a recovery is being prompted by an "unsure" failure a RAID system 100 may utilize an available parity group, instead of devoting a redundancy group for the recovery of parity group suspected of undergoing a failure.

We claim:

1. A method for determining priority recovery for a RAID implementation, the method comprising:
   detecting a first failure of the RAID implementation, wherein the RAID implementation is declustered, and wherein the detecting is based on a first probability of being an actual failure;
   detecting a second failure of the RAID implementation, wherein the detecting is based on a second probability of being an actual failure;
   assigning a first priority to the first failure and a second priority to the second failure;
   setting the priority of the recovery based on the first priority and the second priority; and
   weighing a first parameter associated with the first priority and a second parameter associated with the second priority, wherein the first parameter and the second parameter are based on a probability that a failure is false positive.

2. The method according to claim 1, wherein the detecting of the first failure and the detecting of the second failure comprises determining a type of the first failure and a type of the second failure.

3. The method according to claim 2, wherein the type of failure is a "sure" failure or an "unsure" failure.

4. The method according to claim 2, wherein the type of failure is a network failure, a slow disk failure, or a disk error failure.

5. The method according to claim 2, wherein assigning the first priority and the second priority is based on a first count of the type of the first failure and a second count of the type of the second failure.

6. The method according to claim 1, further comprising storing a log of the first failure and the second failure in a priority recovery table.

7. A RAID system, comprising:
   a n-array of drives to store m-parity groups; and
   a data store to store a priority recovery table, wherein if a failure occurs to any of the m parity groups, the RAID system updates the priority recovery table, wherein a determination if the failure occurs is based on a probability of being an actual failure, and wherein the priority recovery table comprises a parity group field, a hash-table field, and a count of failures field, and wherein the count of failures field comprises a first count for "sure" failures and a second count for "unsure" failures.

8. The system according to claim 7, wherein the RAID system determines an order of recovery based on the priority recovery table.

9. The system according to claim 7, wherein the n-array drives further comprise a redundancy group, and in response to the failure, the RAID system performs recovery by utilizing an available duster group.

10. The system according to claim 7, wherein each of the m-parity groups store an associated priority for determining recovery order.

* * * * *